June 19, 1956 J. MARTIN 2,751,171
CONTROL MEANS FOR USE WITH EJECTION SEATS OF AIRCRAFT
Filed Sept. 9, 1953
3 Sheets-Sheet 1
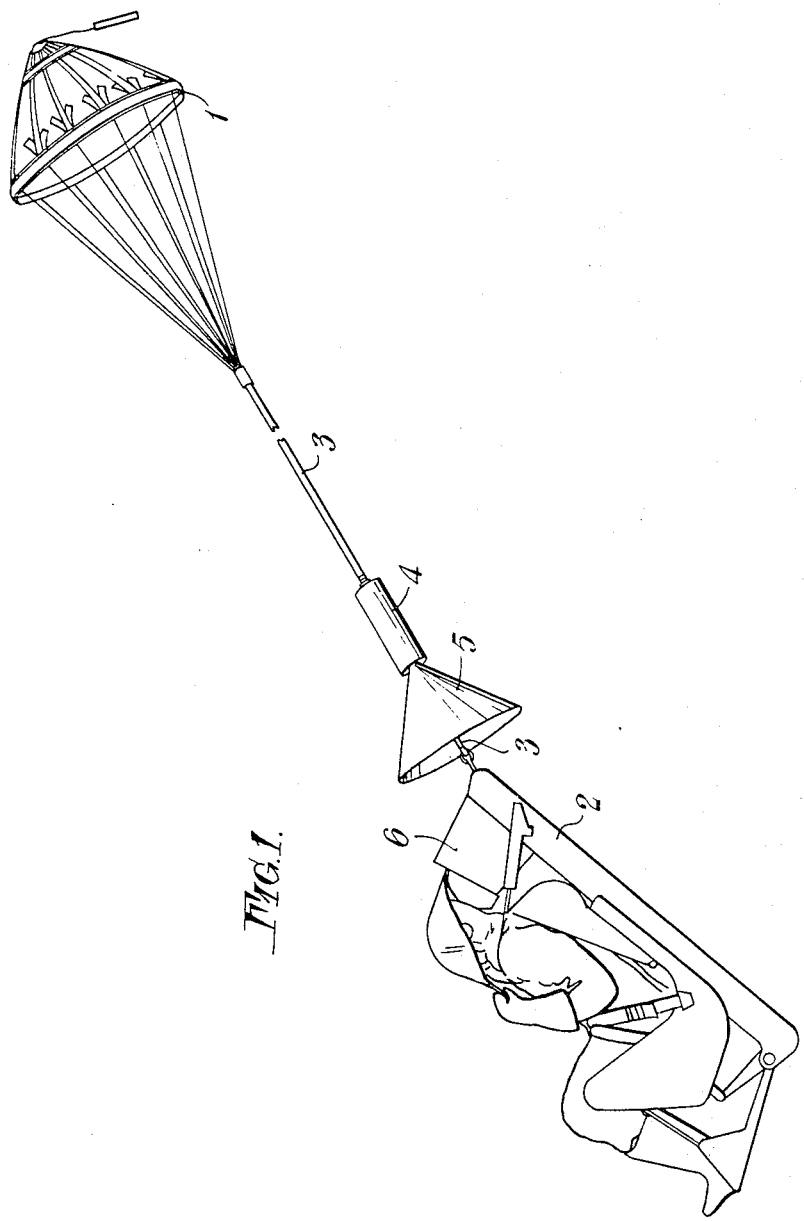

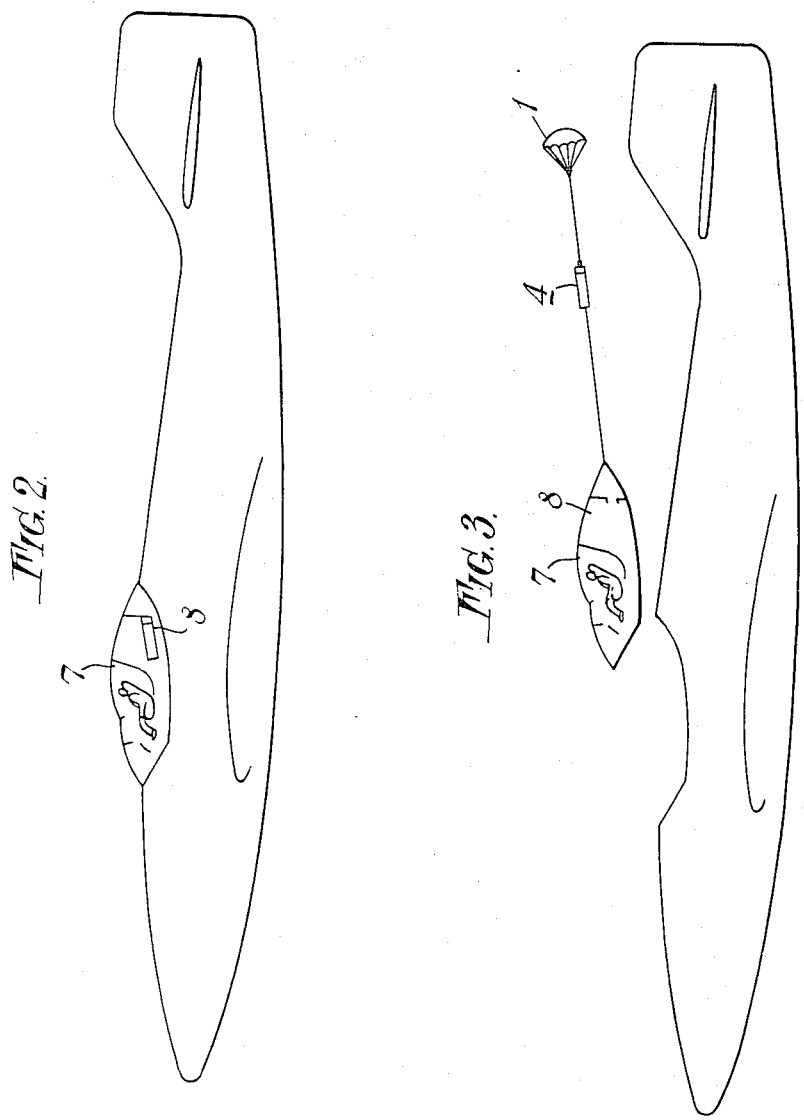

June 19, 1956  J. MARTIN  2,751,171
CONTROL MEANS FOR USE WITH EJECTION SEATS OF AIRCRAFT
Filed Sept. 9, 1953  3 Sheets-Sheet 3

Inventor
JAMES MARTIN
per Worth Wade
Attorney

United States Patent Office 2,751,171
Patented June 19, 1956

2,751,171
CONTROL MEANS FOR USE WITH EJECTION SEATS OF AIRCRAFT

James Martin, Higher Denham, near Uxbridge, England

Application September 9, 1953, Serial No. 379,196

2 Claims. (Cl. 244—141)

The present invention relates to improvements in and relating to means for slowing up ejection seats of aircraft.

As examples of seats, to which the present invention is directed, may be mentioned my prior Patents Nos. 2,467,763 and 2,527,020, although it is to be understood that the invention is not confined thereto.

The invention is suitable for an ejection seat in which a drogue attached to the seat comes into operation automatically when the seat with its occupant, has been expelled from the aircraft.

In certain circumstances when a drogue is used a disadvantage in the use alone thereof may occur, and it is mainly to overcome this disadvantage or drawback, when occurring, that the present invention is directed.

The present invention in its preferred form provides means for slowing up an ejection seat or jettisonable cabin or pod after this has been ejected or released from an aircraft, the means comprising a rocket or similar apparatus in combination with a drogue.

For the purpose of illustrating the function of the present invention, let it be assumed that a seat or cockpit or "pod" is ejected at a high speed and that the aircraft is in a vertical position, i. e. diving substantially vertically towards the ground and having a forward speed of say 1000 feet per second, and at a height of 750 feet. The seat equipped with a normal size drogue, if ejected at such an angle and travelling at such a speed would strike the ground in approximately one second after ejection. The use of a drogue for effecting a practical slowing up in the time available, is thus not always satisfactory, for the reason that the size of the drogue would have to be such that the load produced at the time of opening would injure the pilot.

Again, in some cases when an ejection seat or cockpit or "pod" is shot out of an aircraft, it is sometimes desirable, at whatever the height, to be able to slow up the seat in the shortest possible time, and this is done by means of a rocket or similar apparatus in combination with the action of a drogue.

Means are provided for deflecting the hot gases or fluid stream issuing from the rocket so that these do not impinge on the drogue connection to the seat or on the pilot.

The accompanying drawings illustrate examples of the carrying into effect of the invention.

In the drawings:

Fig. 1 is a diagrammatic view showing a seat after ejection with a rocket and drogue in tandem.

Fig. 2 is a diagrammatic view showing a jettisonable cabin or pod before ejection from an aircraft.

Fig. 3 is a similar view to Fig. 2 but showing the jettisonable cabin or pod after ejection with a rocket and drogue in tandem.

Figure 4:
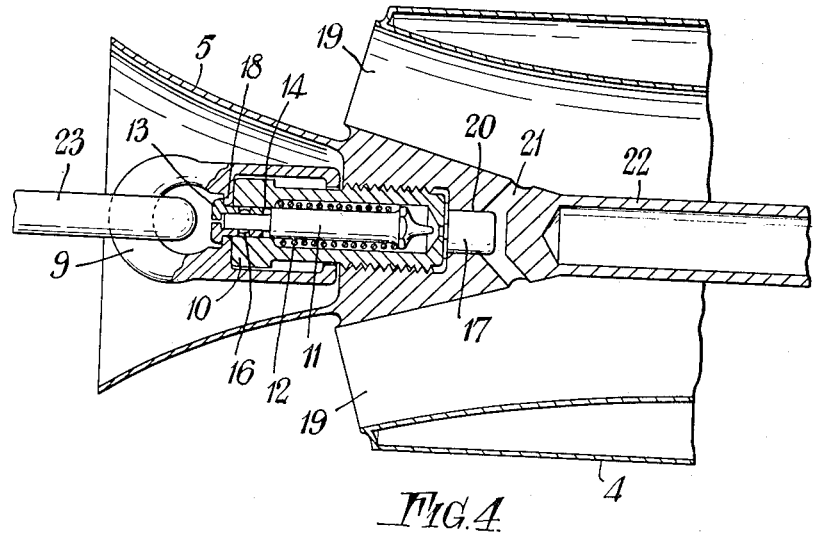
Fig. 4 is a sectional view of a form of firing mechanism for the rocket, the mechanism being in the locked position.

Referring to Fig. 1 it will be seen that a drogue 1 is connected to a seat 2 by a tow line 3. Between the drogue 1 and the seat 2 is a rocket 4, which is fired by the pull of the drogue. Alternatively the firing may be by some other automatic means, or manual means. A deflecting cone 5 deflects the hot gases or fluid stream issuing from the rocket away from the drogue attachment connexion to the seat and also from the seat itself and the person sitting in the seat.

The drogue and rocket normally would be housed within a container 6 on the seat 1.

Figs. 2 and 3 show the drogue 1 and rocket 4 applied to a jettisonable cabin or pod 7 of an aircraft. The drogue and rocket are normally housed in a compartment 8 of the cabin or pod.

Figures 5, 6:
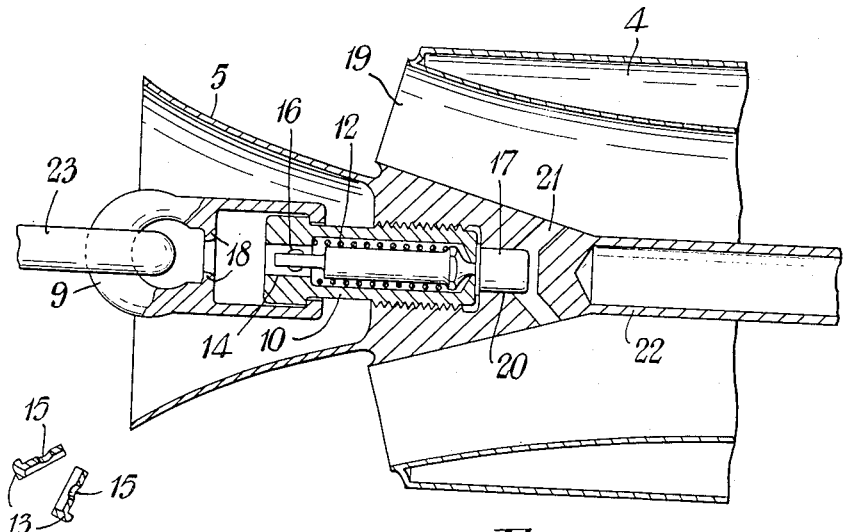
Fig. 5 is a similar view with the mechanism released for firing.
Fig. 6 is a view of a split locking collar referred to later.

Figs. 4 and 5 illustrate a form of firing mechanism for the rocket.

This mechanism comprises a shackle fitting 9 mounted on a firing body 10 screwed to the cone body 5. Mounted for movement within the body 10 is a firing pin 11 under the influence of a spring 12, the latter bearing at one end against a shoulder on the firing pin and at the other again a shouldered down part of the body 10. A split locking collar 13 is normally located in a restriction 14 of the body 10.

Each limb of the locking collar has a recess or groove 15 engaging a boss 16 on the firing pin 11 and serving to hold the latter in a locked position away from an initiating cartridge 17. The head of the locking collar is engaged by a claw 18 of the shackle fitting 9, so that movement towards the cartridge 17 is prevented.

The wall of the deflecting cone 5 projects from the body of the rocket 4, and the hot gases or fluid stream issue from the inferior of the rocket through an outlet 19. The other end of the rocket is of course closed. The body of the cone has a chamber 20 for the cartridge 17 and a passage 21 leading from said chamber to the interior of the rocket. The body of the cone is extended to form a sleeve coupling 22 for a tow line attached to the drogue. The cone may be formed integral with the rocket body or secured thereto. Attached to the shackle fitting 9 is a tow line 23 which is connected to the ejection seat or cabin or pod.

When the tow line 23 becomes taut the shackle fitting 9 is drawn along the firing body 10. This movement draws out the firing pin 11 against the spring 12 until such time as the split locking collar 13 is withdrawn and falls away from the restriction 14 of the body 10. When this happens the firing pin 11 is released and the force of the spring returns the pin which strikes the initiating cartridge 17 and the rocket is fired.

The term "ejection seat" used in the claims is intended to cover also a jettisonable cabin or pod in which the seat itself remains therein after the cabin or pod has been ejected from an aircraft.

It will be apparent that the invention can be modified and changed within the scope of the appended claims.

I claim:

1. Means for slowing up an ejection seat after this has been ejected from an aircraft, comprising a rocket and a drogue, a tow line connected to the seat, said rocket and drogue being mounted in tandem on the tow line, a spring loaded firing pin for firing the rocket when said tow line becomes taut, a cone member projecting from the body of the rocket for deflecting the hot gases issuing from the rocket away from the seat, a body fixed to the cone and within which the firing pin works, a shackle fitting movable along said body, an initiator cartridge, and means controlled by the shackle fitting normally holding the firing pin away from the initiator cartridge, but which on movement of the shackle fitting is moved to release the firing pin to strike the cartridge and fire the rocket.

2. The combination with an ejection seat and a drogue, for slowing up the seat and a tow line attached to said seat and also to the drogue, of additional slowing up means comprising a rocket interposed on the tow line between the drogue and the seat, a cone member projecting from the body of the rocket for deflecting the hot gases issuing form the rocket away from the seat, a body within said cone member, and mechanically actuated firing mechanism for the rocket housed within the cone member, said firing mechanism becoming operative when the tow line between the drogue and the seat is pulled taut.

References Cited in the file of this patent

UNITED STATES PATENTS

| | | |
|---|---|---|
| 1,611,353 | Lepinte | Dec. 21, 1926 |
| 2,527,020 | Martin | Oct. 24, 1950 |
| 2,539,643 | Smythe | Jan. 30, 1951 |
| 2,552,181 | Kleinhans | May 8, 1951 |
| 2,560,445 | Jackson | July 10, 1951 |

FOREIGN PATENTS

| | | |
|---|---|---|
| 330,443 | Great Britain | June 12, 1930 |